United States Patent
Stirniman et al.

(10) Patent No.: US 6,190,749 B1
(45) Date of Patent: Feb. 20, 2001

(54) HYDROXYETHYLOXYMETHYL TERMINATED PERFLUOROPOLYETHERS FOR LUBRICATION OF DISCS IN INFORMATION STORAGE SYSTEMS

(75) Inventors: Michael Joseph Stirniman; Samuel John Falcone, both of San Jose; Bruno Jean Marchon, Palo Alto; Jing Gui, Fremont, all of CA (US)

(73) Assignee: Seagate Technology LLC, Scotts Valley, CA (US)

(*) Notice: Under 35 U.S.C. 154(b), the term of this patent shall be extended for 0 days.

(21) Appl. No.: 09/205,088

(22) Filed: Dec. 4, 1998

Related U.S. Application Data

(63) Continuation-in-part of application No. 09/107,749, filed on Jun. 30, 1998, now abandoned.
(60) Provisional application No. 60/067,678, filed on Dec. 5, 1997, now abandoned.

(51) Int. Cl.$^7$ ................................................. C23C 14/34
(52) U.S. Cl. ...................... 428/64.1; 428/65.4; 428/65.8; 428/421; 428/694 TF; 428/900; 428/694 TC
(58) Field of Search .............................. 428/421, 694 TF, 428/900, 64.1, 65.8, 65.4, 694 TC

(56) References Cited

U.S. PATENT DOCUMENTS

| | | | | |
|---|---|---|---|---|
| 5,292,585 | * | 3/1994 | Ohnuki et al. | 428/336 |
| 5,593,341 | * | 1/1997 | Gonnella et al. | 451/57 |
| 5,855,746 | * | 1/1999 | Probhakara et al. | 204/192.16 |
| 5,858,182 | * | 1/1999 | Horng et al. | 204/192.16 |
| 5,858,536 | * | 1/1999 | Yanagisawa | 428/408 |
| 5,885,724 | * | 3/1999 | Yoshida et al. | 428/694 T |

\* cited by examiner

*Primary Examiner*—Stevan A. Resan
(74) *Attorney, Agent, or Firm*—Flehr Hohbach Test Albritton & Herbert LLP

(57) ABSTRACT

An information storage system including a perfluoropolyether lubricant having hydroxyethyloxymethyl terminated endgroups on the surface of a rigid storage medium is provided. In the subject invention, the perfluoropolyether lubricant has the general repeat formula of: $HO_p(CH_2-CH_2O)CH_2-Z-CH_2(OCH_2-CH_2)_pOH$ where Z is $-CF_2-(OC_2F_4)_m-(CF_2)_n-OCF_2-$, p has an average value of 1.5, the ratio of m to n is approximately 1.0, and the mean molecular weight of the lubricant is in the range of approximately 2000 to 6000.

6 Claims, 6 Drawing Sheets

Water contact angle of fractionated alcohol terminated perfluoropolyether vs. non-fractionated hydroxyethyloxymethyl terminated perfluoropolyether (Stock Zdol-TX)

Fly stiction performance of the two lubricants described in Figure 1.

Stiction and wear performance under ambient conditions for the two lubricants described in Figures 1 and 2.

Fly stiction testing results for fractionated hydroxyethyloxymethyl terminated perfluoropolyether lubricant (MMW Zdol-TX) vs. the fractionated Zdol lubricant.

Ambient CSS testing results for fractionated Zdol-TX, fractionated Zdol, and non-fractionated Zdol-TX.

HYDROXYETHYLOXYMETHYL TERMINATED PERFLUOROPOLYETHERS FOR LUBRICATION OF DISCS IN INFORMATION STORAGE SYSTEMS

CROSS-REFERENCE TO RELATED APPLICATION

This invention is based on U.S. Provisional Patent Application, Serial No. 60/067,678, filed Dec. 5, 1997, abandoned, and is a CIP of U.S. patent application, Ser. No. 09/107,749 filed Jun. 30, 1998 now abandoned, assigned to the assignee of this application and incorporated herein by reference.

FIELD OF THE INVENTION

The field of this invention is lubricants for use in information storage systems. More particularly, the invention pertains to information storage systems employing a lubricant disposed on a disc comprised of a perfluoropolyether having hydroxyethyloxymethyl terminated endgroups.

BACKGROUND OF THE INVENTION

Information storage systems, such as disk drives found in personal computers and other data processing devices, employ a rigid magnetic storage medium which is moved relative to a read/write head to provide information introduction and/or retrieval from the magnetic storage medium. The magnetic storage medium (also referred to as a "disc" or "media" are typically comprised of a thin, rigid substrate, an underlayer, a magnetic layer and a carbon layer atop the magnetic layer. The carbon layer is typically sputtered onto the magnetic layer and is sometimes referred to as an "overcoat." In the design of such devices, it is most desirable from a magnetic standpoint to have the read/write head fly very close to the surface of the disc during movement to maximize the signal quality. Flying too low, however, can cause wear and material interaction which lead to poor system reliability and performance. To reduce the wear and material interaction on the surface of the disc, a lubricant is commonly disposed on the surface of the disc.

The magnetic thin film discs require a barrier lubricant, typically applied on top of the sputtered carbon protective film, to reduce the wear of the interface between the read-write head and the disc during start stop cycles. The mechanical properties of the sputtered carbon film can be varied by incorporation of other elements during its preparation, such as hydrogen and nitrogen. Thus, the chemical interactions between the lubricant and the chemically modified carbon film are very important for the tribological properties of the carbon/lubricant system.

In particular, the lubricant should adhere strongly to the carbon film, and should wet the film uniformly. Failure to wet the film uniformly could cause droplet formation and result in lubricant transfer to the read-write head during operation. In addition, if the lubricant is too volatile, it may transfer to the read-write head through the vapor phase. If enough lubricant is transferred to the head by these mechanisms, it could flood the head-disc interface when the drive is shut down, and the high value of static friction at the flooded interface could cause a drive failure (fly stiction). For the same reason, the lubricant should adhere strongly enough to the carbon film that it does not migrate and flood the head-disc interface during extended periods of operation. On the other hand, if the lubricant is so strongly bound that it does not replenish itself during drive operation, unacceptably high wear rates could result.

Thus, there is interest in the development of improved lubricants that exhibit good lubricating and tribological properties including wear resistance and low stiction.

SUMMARY OF THE INVENTION

Accordingly, it is an object of the present invention to provide an information storage system employing a lubricant exhibiting desirable lubricating properties.

Another object of the present invention is to provide a lubricant having desirable wear resistance properties.

A further object of the present invention is to provide a lubricant that does not flood the head-disc interface when the drive is shut down, such that drive failure is minimized.

More particularly, it is an object of the present invention to provide a lubricant comprised of a perfluoropolyether having hydroxyethyloxymethyl terminated endgroups on the surface of a disc in an information storage system.

These and other objects and advantages are achieved by the invention herein where an information storage system comprising a perfluoropolyether lubricant having hydroxyethyloxymethyl terminated endgroups on the surface of a rigid storage medium is provided. In the subject invention, the perfluoropolyether lubricant has the general formula of:

$HO_p(CH_2-CH_2O)CH_2-Z-CH_2(OCH_2-CH_2)_pOH$ where Z is $-CF_2-(OC_2F_4)_m-(OCF_2)_n-OCF_2-$, p has an average value of 1.5, the ratio of m to n is approximately 1.0 and m and n are selected such that the mean molecular weight of the lubricant is in the range of approximately 2000 to 6000 AMU.

In an alternative embodiment of the invention the perfluoropolyether lubricant having hydroxyethyloxymethyl terminated endgroups is fractionated to remove light and heavy molecular weight components to provide the lubricant with a narrower molecular weight distribution.

BRIEF DESCRIPTION OF THE DRAWINGS

Additional objects and features of the present invention will become apparent upon reading of the detailed description of the invention and the appended claims provided below, and upon reference to the drawings in which:

DETAILED DESCRIPTION OF A PREFERRED EMBODIMENT

Figure 1:
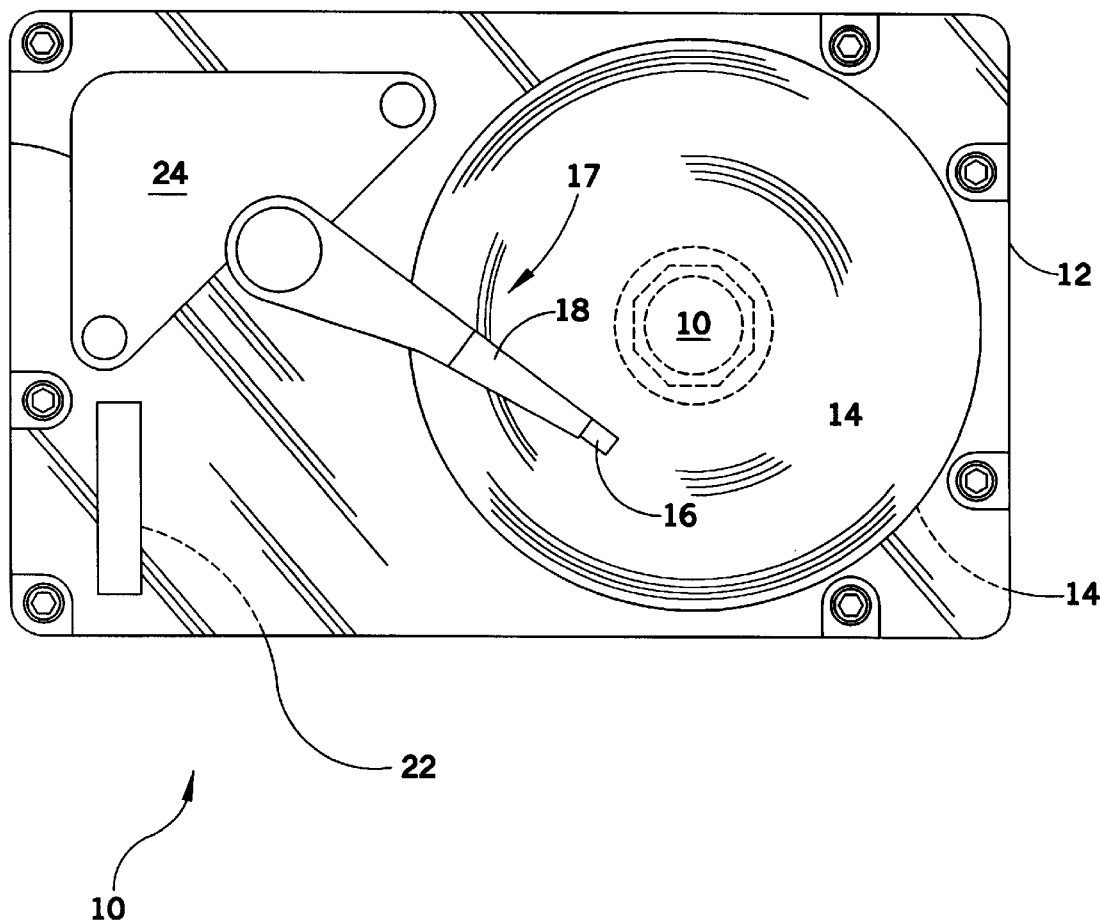
FIG. 1 shows a disc in an information storage system having a lubricant on the surface of the disc in accordance with the present invention.

In summary, the inventors have developed a lubrication system that uses a perfluoropolyether with reactive hydroxyethyloxymethyl endgroups, which is capable of providing superior stiction, fly stiction and wear performance on substrates, particularly substrates having a sputtered nitrogenated or hydrogenated/nitrogenated carbon overcoat. The perfluoropolyether with reactive hydroxyethyloxymethyl endgroups is commercially available (Fomblin Zdol-TX, Ausimont), and has a mean molecular weight ($M_n$) of about 2500 AMU. The commercially available starting material can be fractionated to remove light molecular weight components, further improving its fly stiction performance and lowering its vapor pressure. Water contact angle measurements show that this lubricant of the present invention is more uniformly distributed on a nitrogenated carbon overcoat than alcohol terminated perfluoropolyethers (Fomblin Zdol, Ausimont). Contact start stop (CSS) testing of this lubricant applied to nitrogenated carbon overcoats shows that it has superior stiction and wear performance as compared to conventional lubricants such as Zdol, and fly stiction testing also shows the lubricant of the present invention to be superior to Zdol.

Specifically, an information storage system having a lubricant on the surface of a rigid storage medium (or disc) is provided. The lubricant is comprised of a perfluoropolyether lubricant having hydroxyethyloxymethyl terminated endgroups. The lubricant of the invention has a general structure of the formula:

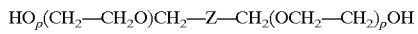

where Z is $-CF_2-(OC_2F_4)_m-(OCF_2)_n-OCF_2$, p has an average value of 1.5, the ratio of m to n is approximately 1.0. m and n are selected such that the mean molecular weight of the lubricant is in the range of approximately 2000 to 6000 AMU, and preferably in the range of approximately 2700 to 3300 AMU.

The lubricant of the present invention comprised of a perfluoropolyether with reactive hydroxyethyloxymethyl endgroups is commercially available from Ausimont chemical company and is sold under the trade name Zdol-TX. Zdol-TX has a mean molecular weight of about 2500 AMU.

The lubricant of the present invention is useful on nitrogenated carbon overcoats (a-CNx) and hydrogenated nitrogenated carbon overcoats (a-CHxNy, and also referred to as "hybrid" overcoats). The inventors have found that specific molecular weights of the lubricant are most useful on a particular type of disc. In the preferred embodiment, the disc contains a nitrogenated carbon overcoat with the lubricant of the present invention being fractionated and having a molecular weight of approximately 2700 to 3300 AMU.

Preferably, the lubricant is fractionated to remove the lighter molecular weight components, below approximately 2500 AMU and above approximately 3500 AMU. The fractionated lubricant has a molecular weight in the range of approximately 2700 to 3300, with a mean molecular weight of approximately 3000AMU. The lubricant may be prepared by fractionating stock Zdol-TX as received from the supplier.

The lubricant of the present invention is generally provided as a solution carried in a solvent and may be applied directly to a disc. The term "solvent" means a solvent in which the lubricant is soluble, such as fluorinated organic solvents. Preferably the solvent is PF-5060. The concentration of the polymer in the solvent will be in the range of 0.001 to 1.0 wt % lubricant, and preferably in the range of 0.01 to 0.1 wt % lubricant.

The disc is housed in an information storage system. The information storage system will comprise at least a head-disc assembly and control electronics which may be employed with a computer, printer or fax machine or other host system. Many different information storage system configurations are known in the art. A simplified drawing of an exemplary information storage system is shown in FIG. 1. As shown in FIG. 1 the information storage system 10 includes a sealed housing 12, a rigid magnetic storage medium 14 which is usually in the form of a disc, a read/write head 16, and an actuator assembly 17 having an actuator arm 18 for positioning the read/write head 16 disposed at the end of the actuator arm 18 over the surface of the disc 14. Multiple read/write heads may be employed although not shown in the plan view. The read/write head 16 carries a read/write element (not shown), and the element can be any type known in the art, such as inductive thin film, MIG or MR. A spindle motor 10 is provided which mounts the disc or discs 14 and spins them at a constant speed. A header assembly 22 is provided for transferring electronic signals to and from a motor 24 which positions the actuator and the read/write head 16 as data is transferred to and from the disc 14.

Generally, the surface of the disc 14 will be textured. The entire surface of the disc may be textured to minimize stiction, friction, and wear during start-stop cycles. Alternatively, separate textured data and landing zones may be provided on the surface of the disc. The lubricant is disposed on the surface of the disc 14 and acts to minimize wear, friction and stiction between the disc and the read/write head as the read/write head passes over the disc. Of particular advantage, the present invention provides an improved lubricant and enhances the wear resistance and the stiction performance of the lubricant. The perfluoropolyether lubricant with reactive hydroxyethyloxymethyl endgroups is disposed on the surface of the disc 14 by means such as dip coating or spin-on coating. To provide desirable lubricating properties, the thickness of the perfluoropolyether lubricant with reactive hydroxyethyloxymethyl endgroups disposed on the surface of the disc is in the range of 10 Å to 50 Å, and preferably is in the range of 20 Å to 40 Å.

Figure 2:
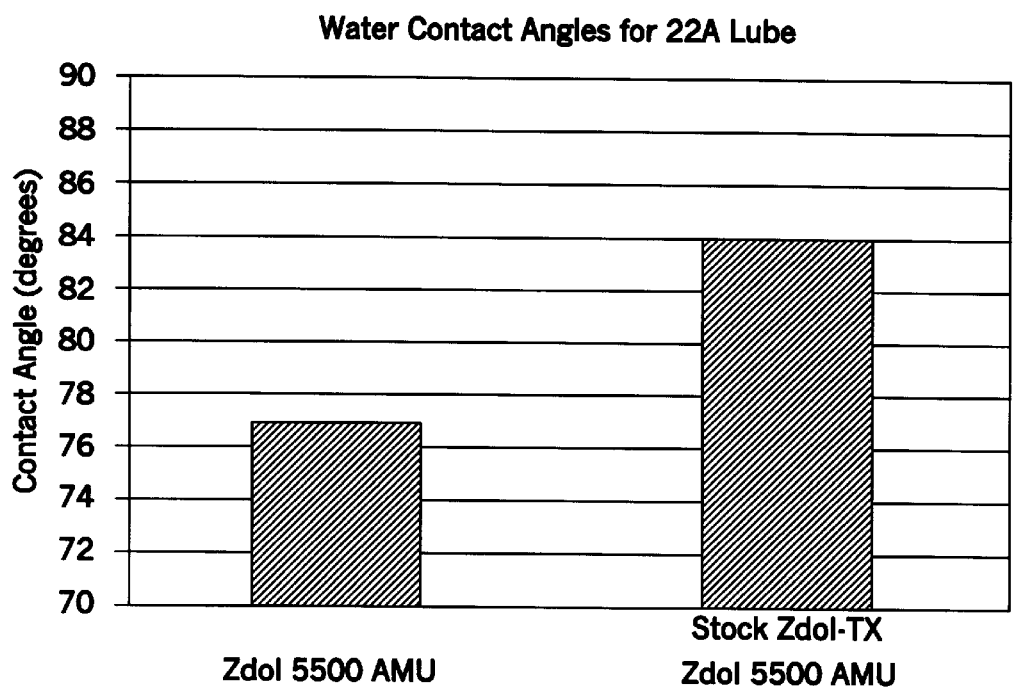
FIG. 2 shows water contact angles exhibited by a conventional lubricant and one embodiment of the lubricant of the present invention.

The properties of the lubricant of the present invention can be seen with reference to FIG. 2. FIG. 2 shows water contact angles exhibited by a conventional lubricant, compared to one embodiment of the lubricant of the present invention. The conventional lubricant is Zdol which is an alcohol terminated perfluoropolyether. The conventional lubricant is shown as "Zdol 5500 AMU" also sometimes referred to as "HMW Zdol" which connotes that the lubricant has high molecular weight components. The lubricant of the present invention is comprised of a perfluoropolyether with reactive hydroxyethyloxymethyl endgroups having a molecular weight in the range of 2000 to 6000 AMU. This embodiment of the lubricant is available as "stock" Zdol-TX, which means the formulation of Zdol-TX that is sold by the manufacturer.

The water contact angles are measured in degrees and shown in FIG. 2. The lubricants were applied to laser zone texture media discs having a nitrogenated overcoat at a thickness of 22 Å. The discs have a bump height of 130 Å to 150 Å with about 100 Å of carbon overcoat. The lubricant of the present invention exhibits a water contact angle of about 84 degrees, as compared to about 77 degrees for the conventional lubricant. The higher water contact angle of the inventive lubricant shows that the lubricant is more uniformly distributed on the overcoat surface of the disc than the convention lubricant. This shows that the lubricant of the present invention exhibits better carbon/lubricant interaction which results in better fly stiction performance.

The lubricant of the present invention is thermally stable and the lubricating properties of the perfluoropolyether with reactive hydroxyethyloxymethyl endgroups are useful over the temperature range of operation of the information storage system, i.e. from approximately 10° C. to 80° C.

EXPERIMENTAL

The following tests demonstrate the capabilities of the present invention and such examples are offered by way of illustration and not by way of limitation.

Contact start-stop (CSS) tests were performed in a conventional spin stand. The discs contain lubricants disposed thereon of varying molecular weight in accordance with the present invention. Laser zone texture media discs having a bump height of 130 Å to 150 Å, with 100 Å of nitrogenated carbon overcoat and hydrogenated/nitrogenated (C/H/N hybrid) carbon overcoat were tested using the lubricant of the present invention.

Figure 3:
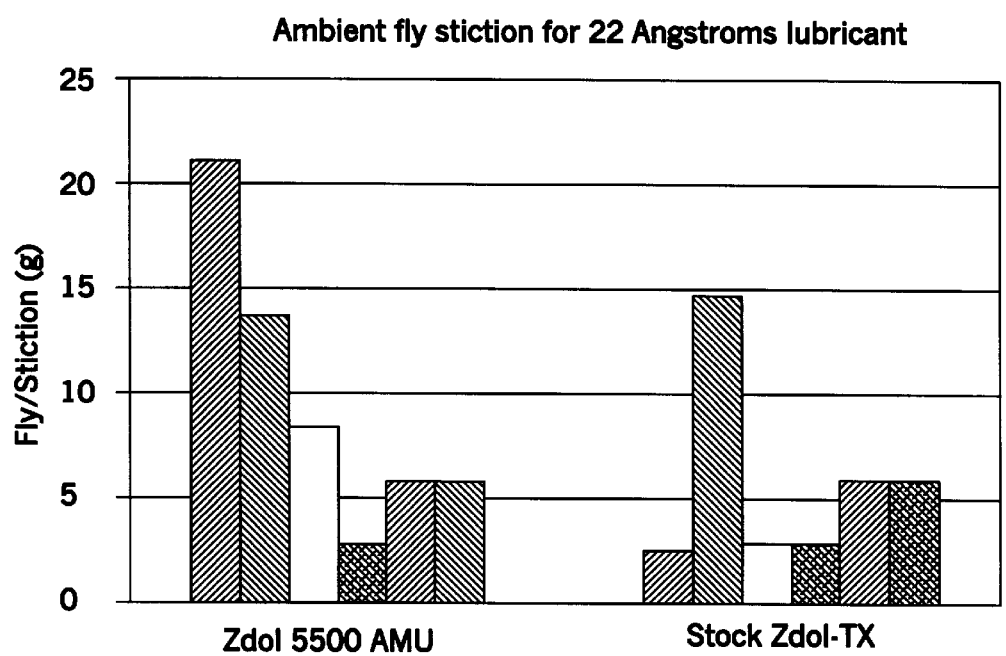
FIG. 3 is a graph comparing the ambient fly stiction for laser zone texture media discs having a conventional lubricant, and the lubricant according to one embodiment of the present invention.

The ambient fly stiction for the discs are shown in FIG. 3. The fly stiction is plotted for a conventional lubricant (i.e. Zdol 5500 AMU) and for one embodiment of the perfluoropolyether lubricant having hydroxyethyloxymethyl terminated endgroups of the present invention (in this case stock Zdol-TX was used). The lubricants were applied to the discs at a thickness of approximately 22 Å and a number of measurements were taken for each disc. As illustrated, the lubricant of the present invention exhibits superior fly stiction characteristics, with the lubricant embodiment of the fractionated perfluoropolyether lubricant having hydroxyethyloxymethyl terminated endgroups providing the better results.

Figure 4:
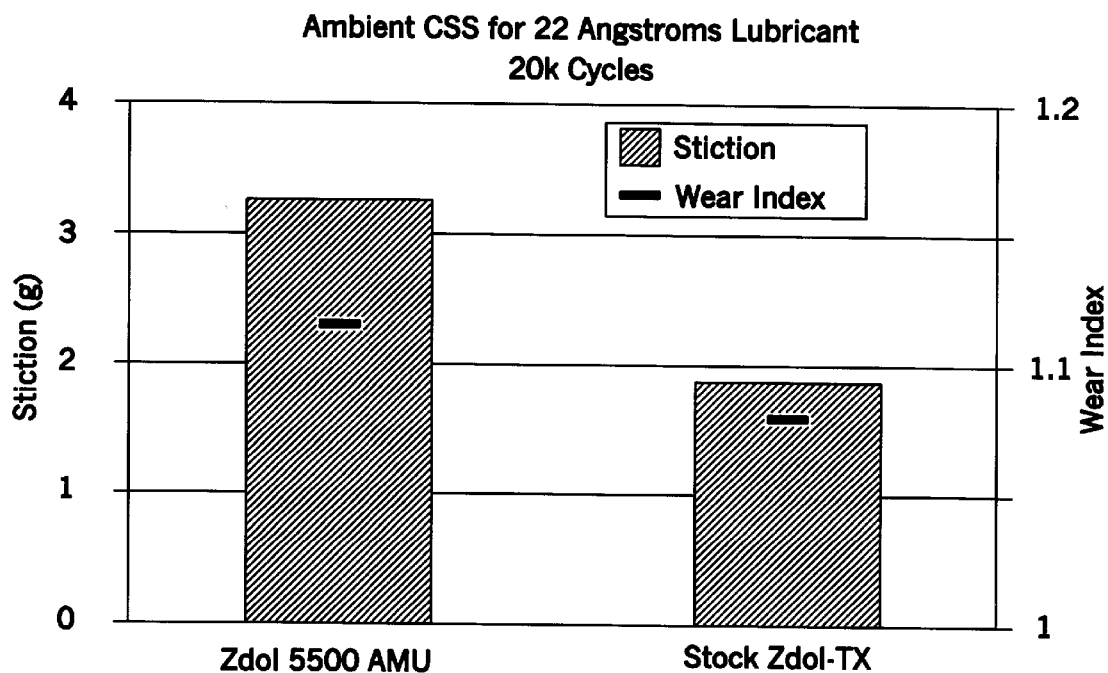
FIG. 4 is a graph showing the stiction and wear index results from contact start-stop (CSS) tests using a conventional lubricant, and one embodiment of the lubricant of the present invention.

Next, the laser zone texture media discs of the type above were subjected to CSS tests using 20,000 cycles. The average wear index and maximum stiction at ambient conditions for the discs are shown in FIG. 4. The wear index and maximum stiction are plotted as a function of the lubricant composition. As shown, the lubricant of the present invention exhibits markedly improved stiction and wear index performance.

Figure 5:
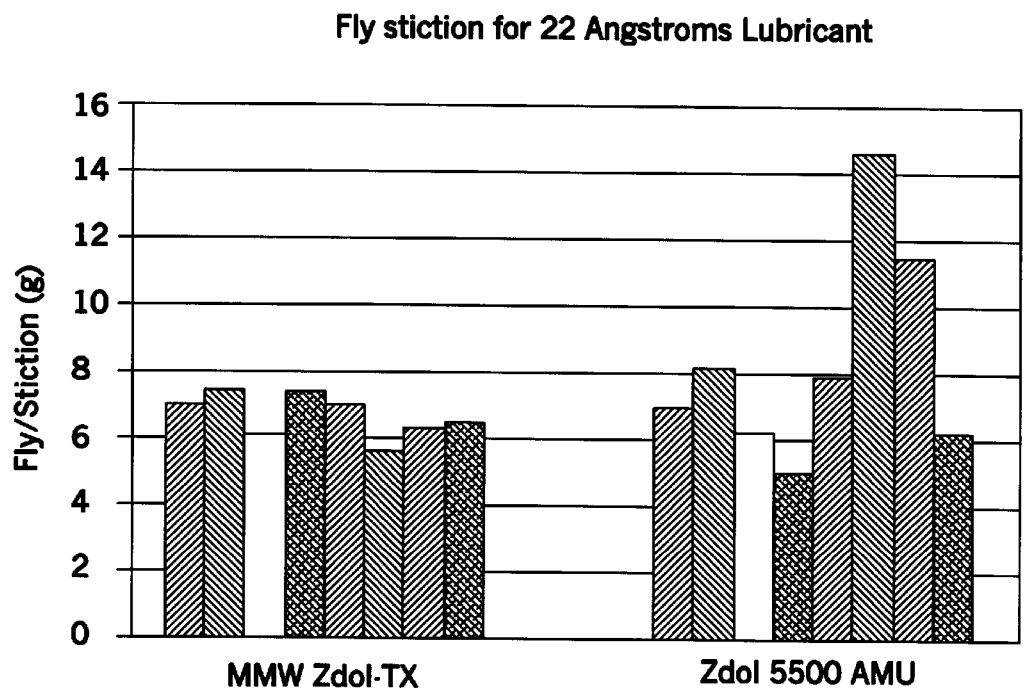
FIG. 5 shows fly/stiction data for laser zone texture media discs tested with a conventional lubricant, and with an alternative embodiment of the lubricant of the present invention.

FIG. 5 shows fly/stiction data for discs tested with a conventional lubricant and with an alternative embodiment of the lubricant of the present invention. The fly stiction is plotted for a conventional lubricant (i.e. Zdol 5500 AMU) and for the alternative embodiment of the present invention which is a fractionated hydroxyethyloxymethyl terminated perfluoropolyether lubricant (MMW Zdol-TX) having a molecular weight in the range of approximately 2700 to 3300 AMU. The lubricants were applied to laser zone texture media discs having a bump height of 130 Å to 150 Å, with 100 Å of nitrogenated carbon overcoat (a-CNx) and hydrogenated/nitrogenated (a-CHxNy) carbon overcoat. The lubricant was applied to the discs at a thickness of approximately 22 Å and a number of measurements were taken for each disc. As illustrated in FIG. 5, the lubricant of the present invention provides superior fly/stiction performance.

Figure 6:
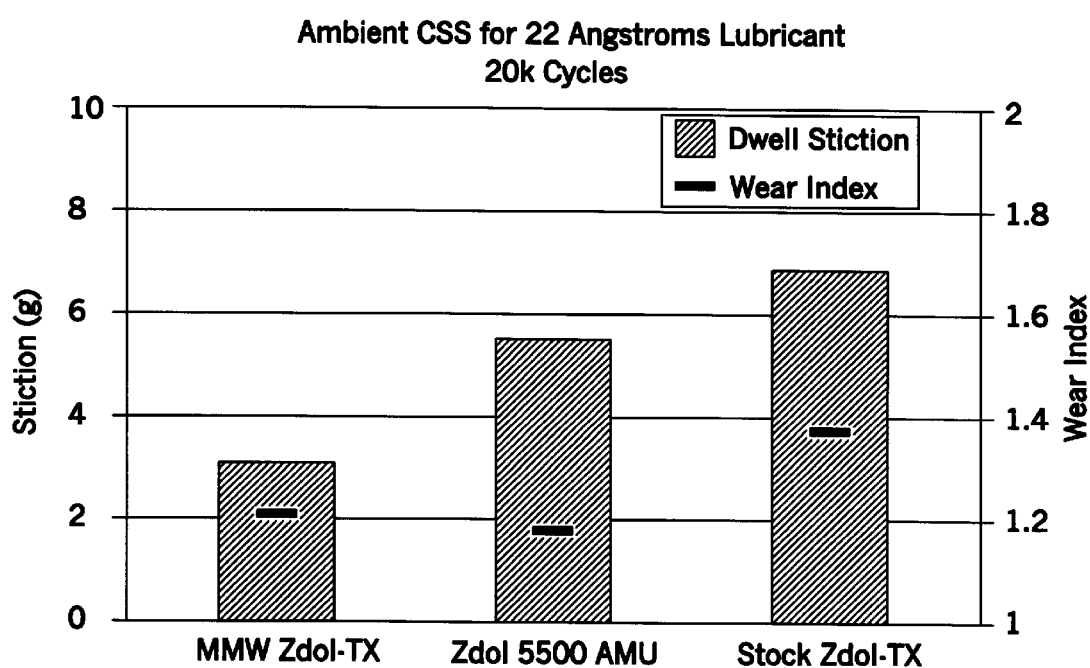
FIG. 6 depicts the wear index and dwell stiction for laser zone texture media discs tested containing a conventional lubricant, and lubricants of varying molecular weight in accordance with the present invention.

FIG. 6 shows fly/stiction data for laser zone texture media discs having a bump height of 130 Å to 150 Å, with 100 Å of nitrogenated carbon overcoat and hydrogenated/nitrogenated (C/H/N hybrid) carbon overcoat with a conventional lubricant disposed thereon and compared with the two embodiments of the present invention. Specifically, three sets of discs were tested, the first set using a conventional lubricant (i.e. Zdol 5500 AMU), and being disposed on the surface of the discs at 22 Å thicknesses. Two additional sets of discs containing two different compositions of the lubricant of the present invention were tested. The first set contains a lubricant composition composed of a fractionated hydroxyethyloxymethyl terminated perfluoropolyether (shown as "MMW Zdol-TX") having a molecular weight in the range of substantially 2700 to 3300 AMU. The second set of discs contains a lubricant composition composed of a hydroxyethyloxymethyl terminated perfluoropolyether (shown as "Stock Zdol-TX") having a molecular weight in the range of substantially 1000 to 6000 AMU. Both of these lubricant compositions of the present invention were applied to the discs at a thickness of 22 Å. CCS tests were conducted under ambient conditions for 20,000 cycles for each of the three sets of discs.

FIG. 6 plots the dwell stiction as well as the average wear index for these discs. The results show that the a fractionated hydroxyethyloxymethyl terminated perfluoropolyether lubricant of the present invention exhibits the lowest dwell stiction due to removal of the high molecular weight components.

It is evident from the above results and discussion that an improved lubricant for information storage systems is provided. The lubricant comprises a perfluoropolyether having hydroxyethyloxymethyl terminated endgroups and provides low wear index and low stiction, and exhibits desirable tribological properties such as good adhesion and wetting properties.

The invention now being fully described, it will be apparent to one of ordinary skill in the art that many changes and modifications can be made thereto without departing from the spirit or scope of the appended claims.

What is claimed is:

1. An information storage system comprising:
   a rigid information storage medium having a nitrogenated carbon overcoat or hydrogenated nitrogenated carbon overcoat on a surface of said medium;
   at least one read/write head comprising a transducer for information introduction and/or retrieval from said medium;
   an actuator supporting said at least one read/write head for moving said transducer relative to said storage medium; and
   lubricating means for lubricating the surface of said storage medium, wherein said lubricating means includes a perfluoropolyether with hydroxyethyloxymethyl endgroups having the formula of:

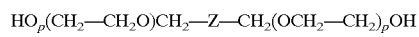

where Z is —CF$_2$—(OC$_2$F$_4$)$_m$—(OCF$_2$)$_n$—OCF$_2$—, and p has an average value of 1.5, the ratio of m to n is approximately 1.0, and where said lubricating means has a molecular weight in the range of approximately 2000 to 6000 AMU.

2. The storage system of claim 1 wherein said lubricating means has a molecular weight in the range of approximately 2700 to 3300 AMU.

3. A disc for use in an information storage system characterized in that a lubricant including a perfluoropolyether with hydroxyethyloxymethyl endgroups is disposed on the surface of said disc, wherein the disc includes a nitrogenated carbon overcoat or a hydrogenated nitrogenated carbon overcoat on the surface of the disc, said lubricant having the chemical formula of:

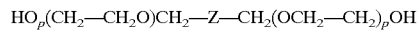

where Z is —CF$_2$—(OC$_2$F$_4$)$_m$—(OCF$_2$)$_n$—OCF$_2$—, and p has an average value of 1.5, the ratio of m to n is approximately 1.0, and where said lubricant has a molecular weight in the range of approximately 2000 to 6000 AMU.

4. The disc of claim 3 wherein said lubricant has a molecular weight in the range of approximately 2700 to 3300.

5. A lubricant disposed on the surface of a disc having a nitrogenated carbon overcoat or a hydrogenated nitrogenated carbon overcoat comprising:

a perfluoropolyether with hydroxyethyloxymethyl endgroups having the chemical formula of:

$$HO_p(CH_2-CH_2O)CH_2-Z-CH_2(OCH_2-CH_2)_pOH$$

where Z is $-CF_2-(OC_2F_4)_m-(OCF_2)_n-OCF_2-$, and p has an average value of 1.5, the ratio of m to n is approximately 1.0, and where said lubricant has a molecular weight in the range of approximately 2000 to 6000 AMU.

6. The lubricant of claim 5 wherein said lubricant has a molecular weight in the range of approximately 2700 to 3300 AMU.

* * * * *